(12) United States Patent
Eernisse

(10) Patent No.: US 7,201,182 B2
(45) Date of Patent: Apr. 10, 2007

(54) LINED VALVE

(75) Inventor: Kenneth Eernisse, Russell, PA (US)

(73) Assignee: Betts Industries, Inc., Warren, PA (US)

( * ) Notice: Subject to any disclaimer, the term of this patent is extended or adjusted under 35 U.S.C. 154(b) by 0 days.

(21) Appl. No.: 11/306,273

(22) Filed: Dec. 21, 2005

(65) Prior Publication Data

US 2006/0219972 A1    Oct. 5, 2006

Related U.S. Application Data

(60) Provisional application No. 60/639,669, filed on Dec. 28, 2004.

(51) Int. Cl.
*F16L 7/00*    (2006.01)
(52) U.S. Cl. .................................... 137/375
(58) Field of Classification Search ................. 137/375
See application file for complete search history.

(56) References Cited

U.S. PATENT DOCUMENTS

| | | | | |
|---|---|---|---|---|
| 2,202,735 A | | 5/1940 | Johnson | |
| 3,073,336 A | * | 1/1963 | Johnson | 137/375 |
| 3,120,247 A | * | 2/1964 | Vogler | 138/148 |
| 3,217,739 A | * | 11/1965 | La Valley et al. | 137/375 |
| 3,227,174 A | * | 1/1966 | Yost | 137/375 |
| 3,336,939 A | | 8/1967 | Freed et al. | |
| 3,498,315 A | | 3/1970 | Graves et al. | |
| 3,647,179 A | | 3/1972 | Scaramucci et al. | |
| 4,184,507 A | * | 1/1980 | Richards | 137/375 |
| 4,219,046 A | | 8/1980 | West et al. | |
| 4,292,992 A | * | 10/1981 | Bhide' | 137/340 |
| 4,696,323 A | | 9/1987 | Iff | |
| 4,971,101 A | * | 11/1990 | Becker et al. | 137/375 |

* cited by examiner

*Primary Examiner*—J. Casimer Jacyna
(74) *Attorney, Agent, or Firm*—Hahn Loeser & Parks, LLP; Robert J. Clark

(57) ABSTRACT

A modular lining system for a valve body for use in fluid handling systems including fluid transport tankers, and a method for lining a valve body using the modular lining system. The lining system is slidably inserted into the valve body to protect the valve body from corrosive or other damaging materials. The liners are placed such that they are easily removable for cleaning or replacing when damaged. An actuator comprising a piston is actuated within one of the liners to selectively allow and stop fluid flow.

17 Claims, 3 Drawing Sheets

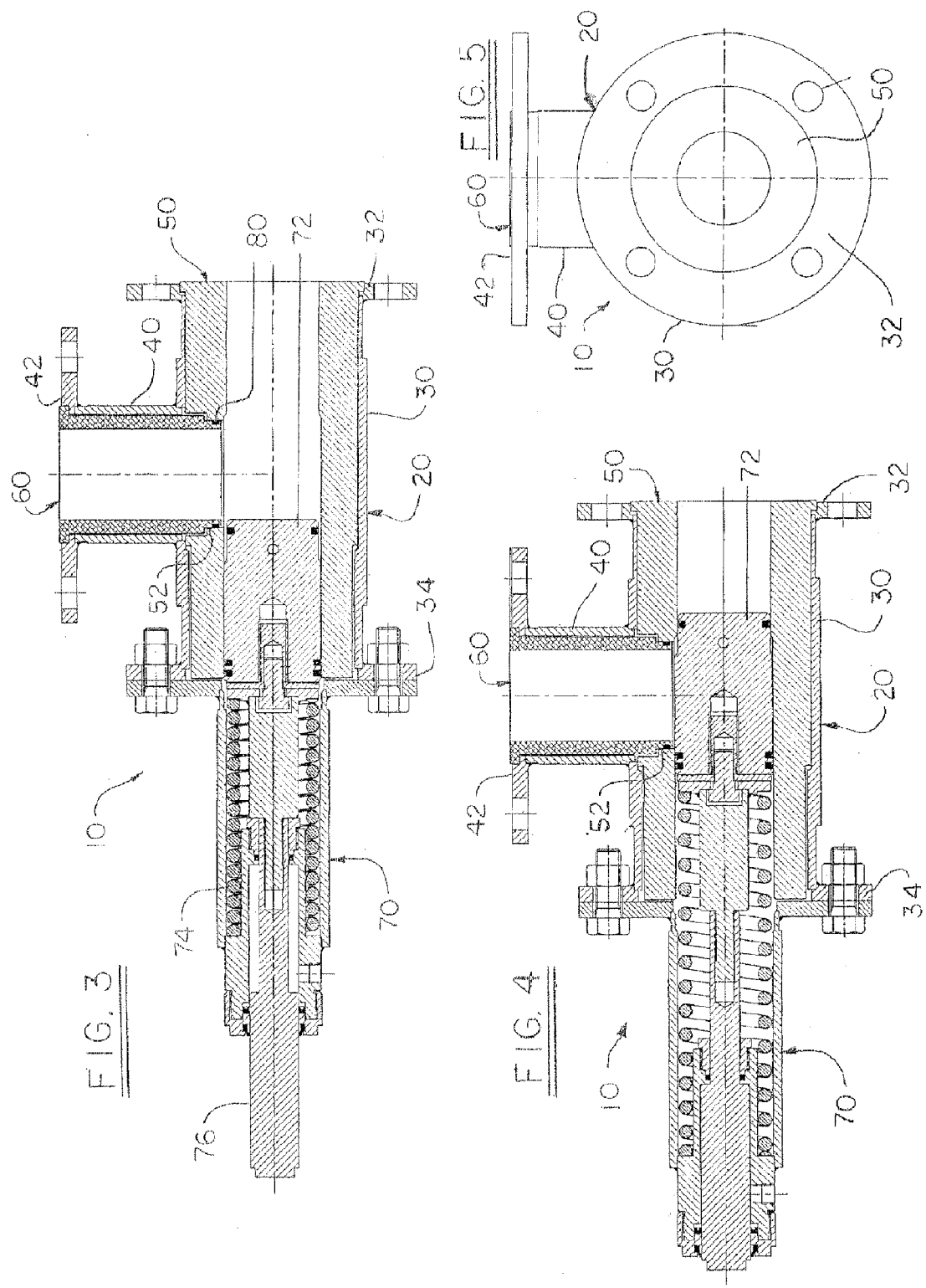

LINED VALVE

This application claims the benefit of U.S. provisional patent application Ser. No. 60/639,669, filed Dec. 28, 2004, and hereby incorporated by reference.

TECHNICAL FIELD

This invention relates to valves used in fluid handling systems including fluid transport tankers and, more particularly, to a valve having a modular lining system that protects the metallic valve components from adverse effects of contact with corrosive fluids, wherein the lining is easily cleaned and easily replaced when damaged.

BACKGROUND OF THE INVENTION

Fluid handling systems are often used in handling corrosive materials or products that must be maintained in a high state of purity. One type of fluid handling system includes bulk fluid transport tankers. Fluid tankers and associated piping and valve components are typically made of stainless steel or other corrosion resistant metallic material. Some tanks are passivated at predetermined time intervals to maintain a protective coat on the tank interior to help increase corrosion resistance. However, tankers are often used to carry acids and corrosive chemicals that will attack virtually any type of metal over a period of time. Examples of such fluids include hydrochloric acid, hydrofluoric acid, ferric chloride, and bleach, to name a few. Transport of these chemicals requires that the tank surfaces and associated components are protected from adverse effects of contact with the cargo by a lining material. Typical tank lining materials are natural rubber, chlorobutyl, or hypalon. The associated piping and valves have also been lined.

Efforts have been made to develop a lined valve to use with such applications. These prior art lined valves typically have a lining permanently affixed (i.e. bonded, molded) to the interior of the valve. This creates a problem if the lining of the permanently lined valve is damaged, as the entire valve will need to be replaced.

Another problem is that the tank and tank valves must be cleaned periodically, especially when the tank will be used to transport a different chemical. The new chemical may react with the previously transported chemical which may not have been completely removed from the tank or valve components. The prior art permanently lined valves are difficult to clean within the confines of the valve.

The lining material typically used in prior art valves are relatively soft and somewhat flexible. The valves are typically designed so that the various lining pieces seal against each other. This can lead to cold flow and eventual leaking of the valve.

Another limitation of prior art valves involves the flow blocking device (butterfly disc, diaphragm, rotary plug, or ball), which is also typically coated with a permanently affixed lining material. If the lining on the flow blocking device is damaged, the entire valve needs to be replaced. Also, the permanent coating increases the thickness of the flow blocking device thereby reducing the volume of fluid flow.

Accordingly, there is need for providing an improved lined valve over current known valves that overcomes one or more of these problems.

SUMMARY OF THE INVENTION

The present invention overcomes at least one disadvantage of the prior art by providing a valve comprising a valve body comprising a tubular first body portion having a first end and a second end, and a tubular second body portion affixed to and intersecting the first body portion, the second body portion having a first end distal from the first body portion; a tubular first lining removably positioned in the first body portion; a tubular second lining removably positioned in the second body portion, the second lining sealingly engaging an aperture in the first lining; and an actuator removably attached to the first end of the first body portion or the first end of the second body portion, the actuator comprising means for selectively stopping and allowing fluid flow through the valve.

The present invention further overcomes at least one disadvantage of the prior art by providing a method of assembling lining into a valve body comprising a cylindrical first body portion having a first end and a second end, and a cylindrical second body portion intersecting the first body portion, the second body portion having a first end distal from the first body portion, the method comprising the steps of slidably inserting a non-metallic first lining into the outlet end of the first body portion such that the first lining extends from the outlet end to the actuator attachment end of the first body portion; slidably inserting a non-metallic second lining into the inlet end of the second body portion such that the second lining sealingly engages an aperture in the first lining and such that the second lining extends from the sealed engagement with the first lining to the inlet end of the second body portion; slidably inserting a non-metallic piston of an actuator into the first lining or the second lining; and attaching the actuator to the end of the corresponding body portion.

These and other advantages will be apparent upon a review of the drawings and detailed description of the invention.

BRIEF DESCRIPTION OF THE DRAWINGS

This invention will now be described in further detail with reference to the accompanying drawings, in which:

FIG. 3 is a cross-sectional view of an embodiment of the valve of the present invention in a valve open condition;

FIG. 4 is a cross-sectional view of the valve of FIG. 3 shown in a valve closed condition;

FIG. 5 is an elevational end view of the valve of FIG. 3; and

DETAILED DESCRIPTION OF THE INVENTION

Figure 1:
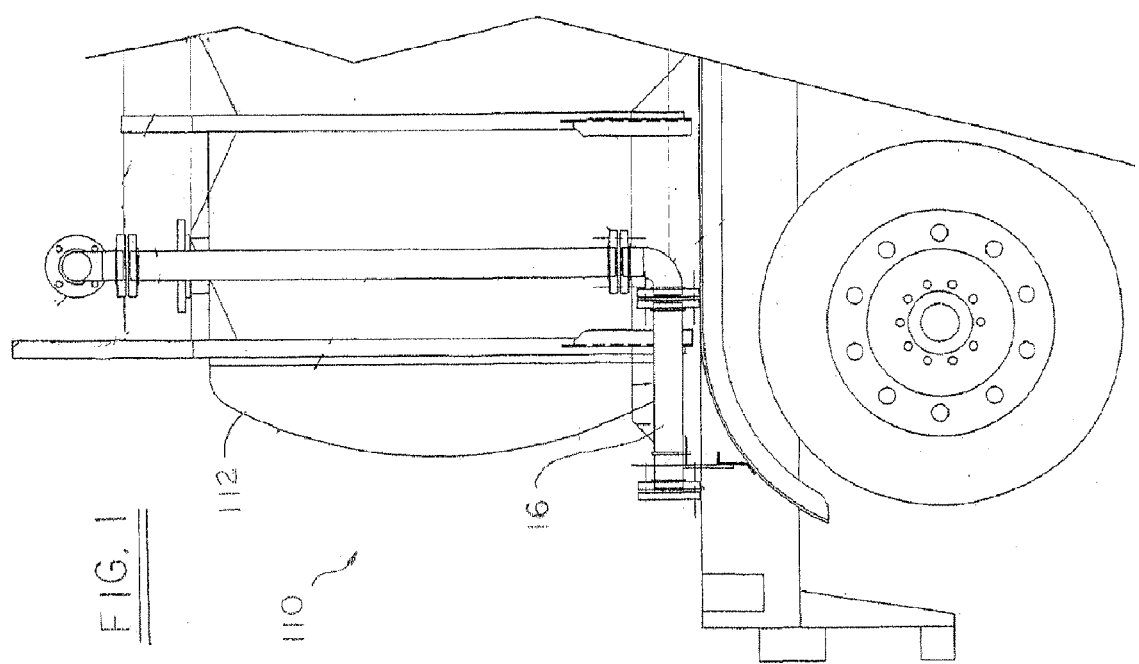
FIG. 1 is an elevational side view of an end portion of a tanker trailer of a type usable with the valve of the present invention.
Figure 2:
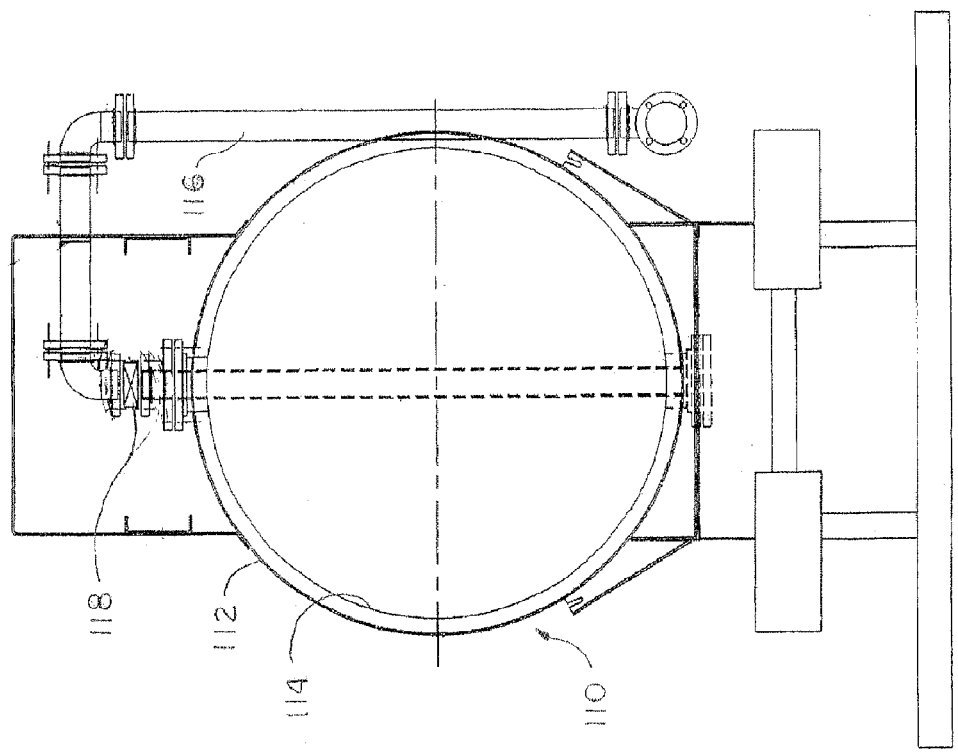
FIG. 2 is an elevational end view of an end portion of the tanker trailer of FIG. 1.

This invention will now be described in detail with reference to various embodiments thereof. Referring now to FIG. 1, an end portion of a tanker trailer 110 is shown. Tanker trailer 110 typically has a stainless steel cargo tank 112 which may be used for transporting fluids including acids, solvents or other chemicals. When hauling these types of materials, the interior 114 of tank 112 is typically lined to protect the tank from adverse effects of contact with the cargo. Typically these tank interiors 114 are lined with natural rubber, chlorobutyl, or hypalon. Piping 116 is shown attached to tank 112 for loading/unloading the cargo. The piping 116 is also preferably lined. Associated with the piping 116, valve 118 is shown in a typical position where the valve of the present invention may be utilized.

The lined valve assembly 10 of the present invention is shown in FIG. 3 in a valve open condition, in FIG. 4 in a valve closed position, and in FIG. 5 in an outlet end view. The valve assembly 10 comprises a metallic valve body 20 comprising a cylindrical first body portion 30 having an outlet end 32 and an actuator attachment end 34, and a cylindrical second body portion 40 fixably attached and intersecting the first body portion 30 in a generally perpendicular position, the second body portion having an inlet end 42 distal from first body portion 30. Although shown herein as a ninety degree elbow, it is contemplated that other valve configurations could be used with the present invention. The valve assembly 10 further comprises a cylindrical first non-metallic lining 50 removably positioned in the first body portion 30 and extending from the outlet end 32 to the actuator attachment end 34 of the first body portion 30. A cylindrical second non-metallic lining 60 is removably positioned in the second body portion 40. A seal 80 on a leading end 62 of the second lining 60 sealingly engages an aperture 52 in the first lining 50. The second lining 60 extends from the engagement with the first lining 50 to the inlet end 42 of the second body portion 40. The valve assembly 10 further comprises a means 70 for selectively preventing and allowing fluid flow between the outlet 32 and the inlet 42 of the valve 10. Means 70 is shown herein as an actuator assembly 70 removably attached to the actuator attachment end 34 of the first body portion 30. Actuator assembly 70 comprises a reciprocal plug 72 shown herein as a cylindrical, non-metallic piston 72 sealingly moveable within the first lining 50 of the first body portion 30 for selectively preventing and allowing fluid flow between the outlet 32 and the inlet 42 of the valve 10. In the valve open condition, the reciprocal plug 72 is completely removed from the fluid passageway allowing maximized fluid flow through the valve 10. The actuator assembly 70 further comprises a main spring 74, which keeps the valve assembly 10 in a closed position. When the actuator 70 is hydraulically activated, the main spring 74 is compressed and the piston 72 is retracted, opening the valve assembly 10. An indicator rod 76 extends from the end of the actuator assembly 70 signaling that the valve assembly 10 is in a valve open condition. Although shown herein as a hydraulically actuated valve, the invention is not intended to be limited as such, and it is contemplated that actuation could be accomplished by any standard means such as manual or pneumatic actuation.

Figure 6:
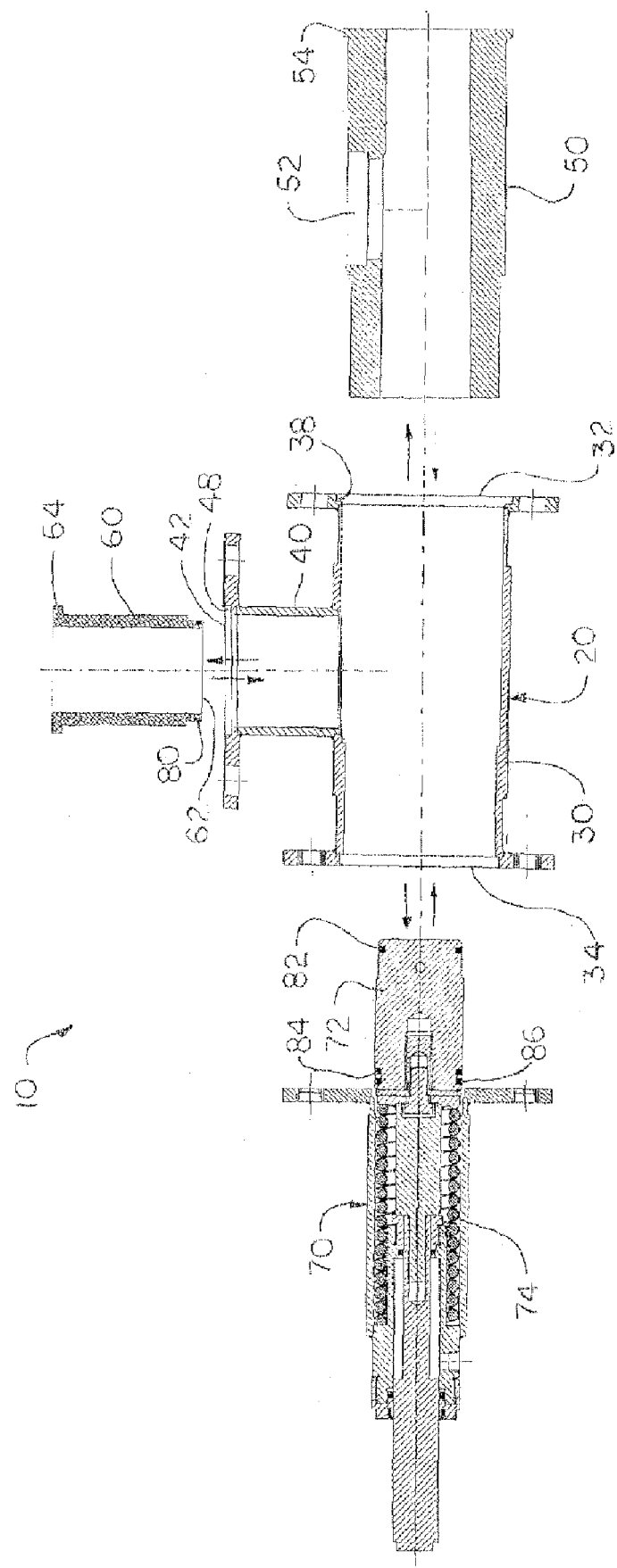
FIG. 6 is a cross-sectional exploded view showing the modular lining components and the valve body and how the modular lining components are removed from the valve body and how they are inserted into the valve body.

The linings 50, 60 form a modular replaceable interlocking lining system. The linings 50, 60 are formed of rigid lining materials formed to removably slide into the valve body, and do not need to be molded or bonded to the valve body, as best shown in FIG. 6. The valve 10 is assembled by slidably inserting the first lining 50 into the outlet end 32 of the first body portion 30 such that the first lining 50 extends from the outlet end 32 to the actuator attachment end 34 of the first body portion 30. Lining 50 is oriented such that aperture 52 is aligned with the second body portion. Lining 50 includes a lining flange 54 that registers against a corresponding recess 38 in the outlet attachment flange 32 of the first body portion 30 and acts to axially locate the lining 50 in the first valve body portion 30. It is noted that the lining flange 54 extends slightly beyond the outlet end 32 to ensure a proper seal with the lining of the adjacent piping (not shown). The lining flange 54 can also be used to aid in the removal of the lining 50 when the lining 50 is configured as a snug fit with the first body portion 30.

The next step is to slidably insert the second lining 60 into the inlet end 42 of the second body portion 40 such that the seal 80 on the leading end 62 of the second lining 60 sealingly engages the aperture 52 in the first lining 50 such that the second lining 60 extends from the sealed engagement with the first lining 50 to the inlet end 42 of the second body portion 40. Lining 60 includes a lining flange 64, which registers against a corresponding recess 48 in the inlet attachment flange 42 of the second body portion 40 and acts to axially locate the lining 60 in the second valve body portion 40. It is noted that the lining flange 64 extends slightly beyond the inlet end 42 to ensure a proper seal with the lining of the adjacent piping (not shown). As with the first lining 50, the lining flange 64 can also be used to aid in the removal of the lining 60 when the lining 60 is configured as a snug fit with the second body portion 40.

The next step involves slidably inserting the piston 72 of the actuator assembly 70 into the first lining 50 and attaching the actuator 70 to the actuator attachment end 34 of the first body portion 30. The piston 72 sealingly engages the interior of the first lining 50 utilizing a seal 82 on the leading end of the piston 72 and a seal 84 on a trailing end of the piston. Secondary seals 86 can be utilized as desired. It is noted that piston 72 may utilize a stepped configuration is association with a stepped interior of the first lining 50.

The plug or piston 72 may be made of the same material as the linings 50, 60. It is also contemplated that the piston 72 may be made of a different lining material or of a metallic material that is covered with a lining material.

When the valve 10 needs to be cleaned, or if one or more of the linings is worn or damaged, or if the installed linings are unsuitable for a fluid to be used in the tank 112, the valve assembly 10 can be easily disassembled and the components cleaned or replaced as needed. To disassemble the valve assembly 10, the steps are generally the reverse of the assembly (although the order of the removal of the actuator assembly 70 and the second lining 60 can be reversed). The second lining 60 needs to be removed prior to removal of the first lining 50 as the second lining helps lock the first lining 50 in position by preventing axial movement of the lining 50 in the first body portion 30.

Unlike existing valves, the modular nature of the linings of the valve of the present invention allows more rigid materials to be used. Since more rigid lining materials can be used, this valve incorporates seals between the lining components, as discussed above, to eliminate cold flow problems. Examples of suitable lining materials include, but are not intended to be limited to, UHMW Polyethylene, Teflon® (PTFE), PVC and the like. Accordingly, the present invention allows a wider range of materials to be selected with less restriction in comparison to prior art lined valves.

Although the present invention has been described above in detail, the same is by way of illustration and example only and is not to be taken as a limitation on the present invention.

What is claimed is:

1. A valve comprising:
    a valve body comprising a tubular first body portion having a first end and a second end, and a tubular second body portion affixed to and intersecting the first body portion, the second body portion having a first end distal from the first body portion;

a unitary, tubular first lining removably positioned in the first body portion, the first lining extending from the first end of the first body portion to the second end of the first body portion;

a tubular second lining removably positioned in the second body portion, the second lining sealingly engaging an aperture in the first lining; and an actuator removably attached to the first end of the first body portion or the first end of the second body portion, the actuator comprising means for selectively stopping and allowing fluid flow through the valve.

2. The valve of claim 1, wherein the second lining comprises a first end having at least one annular seal that sealingly engages the aperture in the first lining.

3. The valve of claim 1, wherein the second lining extends from the engagement with the first lining to the first end of the second body portion.

4. The valve of claim 1, wherein the second body portion is approximately perpendicular to the first body portion.

5. The valve of claim 1, wherein the actuator is removably attached to the first end of the first body portion, and the means for selectively stopping and allowing fluid flow comprises a piston sealingly moveable within the first lining for selectively stopping and allowing fluid flow between the first end of the second body portion and the second end of the first body portion.

6. The valve of claim 1, wherein the actuator is removably attached to the first end of the second body portion, and the means for selectively stopping and allowing fluid flow comprises a piston sealingly moveable within the second lining for selectively stopping and allowing fluid flow between the first end of the first body portion and the second end of the first body portion.

7. The valve of claim 5, wherein the linings and the piston are made of a non-metallic material.

8. The valve of claim 5, wherein the linings and the piston are made of a material selected from the group consisting of polytetrafluoroethylene (Teflon), ultra high molecular weight polyethylene (UHMW), and polyvinyl chloride (PVC).

9. The valve of claim 1, wherein the actuator is hydraulically activated.

10. The valve of claim 1, wherein the actuator is manually activated.

11. The valve of claim 1, wherein the actuator is pneumatically activated.

12. A valve comprising:

a valve body comprising a cylindrical first body portion having an outlet end and an actuator attachment end, and a cylindrical second body portion affixed to and intersecting the first body portion, the second body portion having an inlet end distal from the first body portion;

a cylindrical first lining removably positioned in the first body portion and extending from the outlet end to the actuator attachment end of the first body portion;

a cylindrical second lining removably positioned in the second body portion, the second lining sealingly engaging an aperture in the first lining, the second lining extending from the engagement with the first lining to the inlet end of the second body portion; and an actuator removably attached to the actuator attachment end of the cylindrical first portion, the actuator comprising a cylindrical, piston sealingly moveable within the first lining of the first body portion for selectively stopping and allowing fluid flow between the inlet and the outlet.

13. The valve of claim 12, wherein the second lining comprises a first end having at least one annular seal that sealingly engages the aperture in the first lining.

14. The valve of claim 12, wherein the second body portion is approximately perpendicular to the first body portion.

15. The valve of claim 12, wherein the linings and the piston are made of a non-metallic material.

16. The valve of claim 12, wherein the linings and the piston are made of a material selected from the group consisting of polytetrafluoroethylene (Teflon), ultra high molecular weight polyethylene (UHMW), and polyvinyl chloride (PVC).

17. The valve of claim 12, wherein the actuator is hydraulically activated.

* * * * *